US006444988B1

(12) United States Patent
Vizard

(10) Patent No.: US 6,444,988 B1
(45) Date of Patent: Sep. 3, 2002

(54) ELECTRONIC IMAGING SCREEN WITH OPTICAL INTERFERENCE COATING

(75) Inventor: Douglas L. Vizard, Durham, CT (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/467,409

(22) Filed: Dec. 20, 1999

(51) Int. Cl.[7] .......................... G01T 1/164; G21K 4/00
(52) U.S. Cl. ....................................................... 250/367
(58) Field of Search ............................ 250/367; 378/51

(56) References Cited

U.S. PATENT DOCUMENTS 4,090,081 A * 5/1978 Takami et al. .............. 250/368
4,879,202 A * 11/1989 Hosoi et al. ................ 403/139
5,150,394 A * 9/1992 Karellas ...................... 378/62
5,493,121 A * 2/1996 Fitzpatrick .................. 250/369
5,636,299 A * 6/1997 Bueno et al. ................. 385/15
6,087,665 A * 7/2000 Hoffman et al. ......... 250/483.1

OTHER PUBLICATIONS

Satoh et al., High Luminance Fluorescent Screen with Interference Filter, proc. SPIE, vol. 2432, pp. 462–469/1995.

* cited by examiner

*Primary Examiner*—Constantine Hannaher
*Assistant Examiner*—Shun Lee
(74) *Attorney, Agent, or Firm*—William F. Noval

(57) ABSTRACT

An electronic imaging system including; a transparent support having first and second sides; an optical interference coating on the first side of the transparent support; and a first prompt phosphor layer overlaying the interference coating for use in high resolution ionizing radiation imaging application or in low energy ionizing radiation imaging applications. The system also includes a second prompt phosphor layer which is removably overlaid on the first prompt phosphor layer for use in high energy ionizing radiation applications; and an electronic camera for converting the light image produced by the first and the second prompt phosphor layers when exposed to an ionizing radiation image, into an electronic image; wherein the phosphor of the first and second prompt phosphor layers emits radiation at wavelengths which are passed by the optical interference coating.

8 Claims, 1 Drawing Sheet

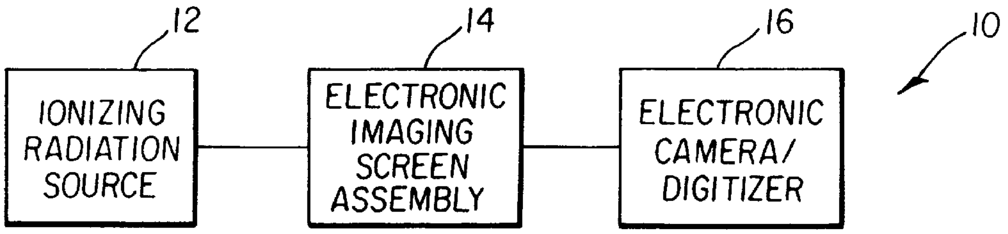
FIG. 1
FIG. 2
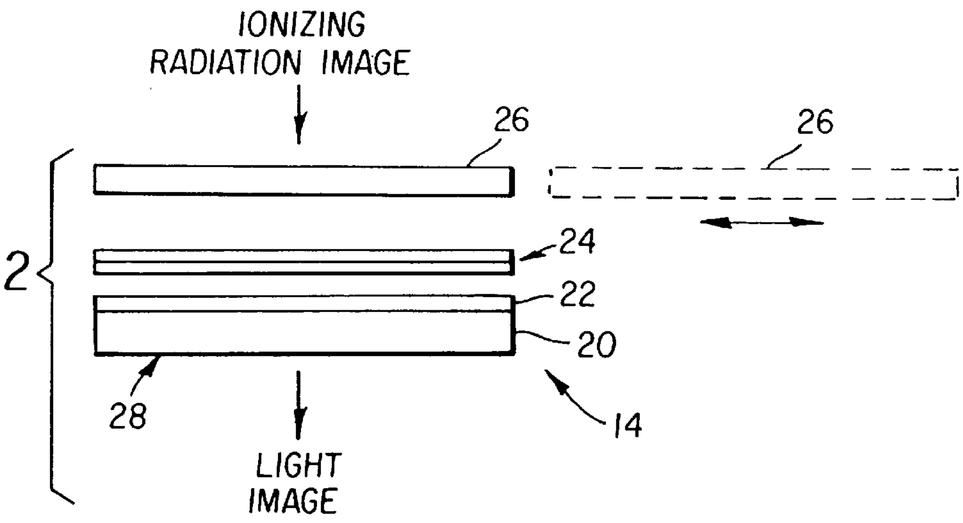
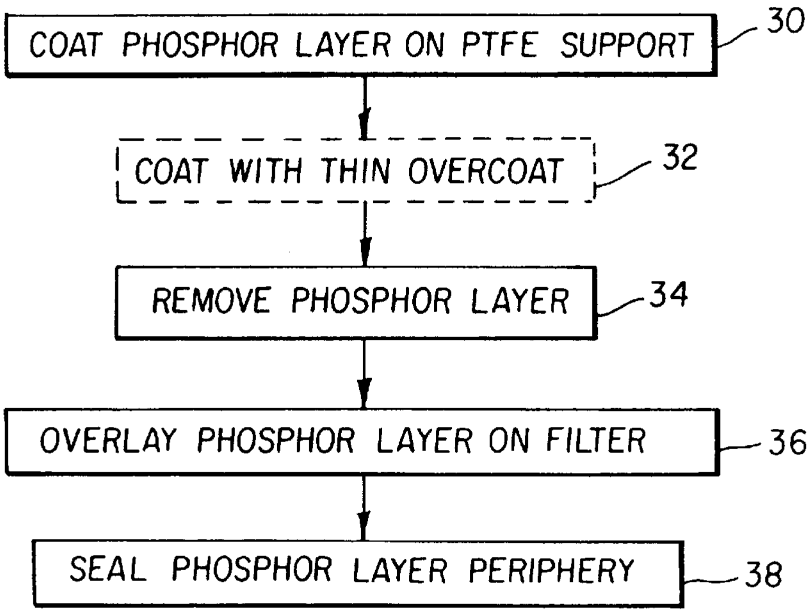
FIG. 3

ELECTRONIC IMAGING SCREEN WITH OPTICAL INTERFERENCE COATING

FIELD OF THE INVENTION

This invention relates in general to electronic imaging systems and more particularly to an electronic imaging system which can alternatively image both high energy and low energy ionizing radiation images.

BACKGROUND OF THE INVENTION

There exists a need for a simple, cost effective and efficient system for electronically capturing images produced by either high energy or low energy ionizing radiation techniques, such as, projection radiography and autoradiography. Conventional film/screen radiography necessitates chemical development of the film before an image can be seen. This process is complex, messy, and time consuming. Moreover, different film/screen combinations must be used for high or low energy ionizing radiation applications. Computed radiography techniques produce a latent radiation image in a storage phosphor which is subsequently converted to an electronic image by a storage phosphor reader. This system is expensive, time consuming and complex. Moreover, neither system provides a representation of the image which can be accessed immediately.

An X-ray image detection system is disclosed by Satoh, et al., *High Luminance Fluorescent Screen with Interference Filter*, proc. SPIE, Vol. 2432, pp. 462–469)(1995). The system consists of a fluorescent screen optically coupled to a CCD camera. The screen included an interference filter which improved angular distribution of light from the screen and which increased the amount of light collected by the CCD. Optimization of the system for high energy or low energy ionizing radiation applications is not disclosed.

SUMMARY OF THE INVENTION

According to the present invention, there is provided a solution to the problems of the prior art.

According to a feature of the present invention, there is provided

An electronic imaging system comprising;

a transparent support having first and second sides;

an optical interference coating on said first side of said transparent support;

a first prompt phosphor layer overlaying said interference coating for use in high resolution ionizing radiation imaging application or imaging in low energy ionizing radiation imaging applications;

a second prompt phosphor layer which can be removably overlaid on said first prompt phosphor layer for use in high energy ionizing radiation applications; and an electronic camera for converting the light image produced by said first and/or said second prompt phosphor layers when exposed to an ionizing radiation image, into an electronic image;

wherein said phosphor of said first and second prompt phosphor layers emits radiation at wavelengths which are passed by said optical interference coating.

ADVANTAGEOUS EFFECT OF THE INVENTION

The invention has the following advantages.

1. An electronic imaging system alternatively images both high energy and low energy ionizing radiation images.

2. An electronic imaging system for radiographic and autoradiographic applications which is simple, cost effective and efficient.

3. A representation of a radiation image can be accessed immediately.

BRIEF DESCRIPTION OF THE DRAWINGS

FIG. 1 is a diagrammatic view of an electronic imaging system incorporating the present invention.

FIG. 2 is a diagrammatic view of an electronic imaging screen assembly according to the present invention.

FIG. 3 is a flow diagram of a method according to the present invention for making a phosphor screen.

DETAILED DESCRIPTION OF THE INVENTION

The invention has been described in detail with particular reference to certain preferred embodiments thereof, but it will be understood that variations and modifications can be effected within the spirit and scope of the invention.

Referring now to FIG. 1, there is shown, an electronic imaging system according to the present invention. As shown an electronic imaging system 10 includes an electronic imaging screen assembly 14 which receives an ionizing radiation image from ionizing radiation source 12. Source 12 can be any source of high or low energy ionizing radiation, such as, conventional radiography where an X-ray image is produced by projecting X-rays through an object of interest, autoradiographic images produced in contact with or in close proximity to electronic imaging screen assembly 14; nuclear images produced in a living being placed in contact with or in close proximity to assembly 14; and electron imaging such as produced in an electron microscope.

Assembly 14 converts the ionizing radiation image into a light image which is captured by electronic camera 16. Camera 16 converts the light image into an electronic image which can be digitized. The digitized image can be displayed on a monitor, stored in memory, transmitted to a remote location, processed to enhance the image, and/or used to print a permanent copy of the image.

Referring now to FIG. 2, there is shown an embodiment of the electronic imaging screen assembly of the present invention. As shown, assembly 14 includes a transparent support 20 (such as glass) upon which is coated an interference filter 22 which is a multicoated short-pass filter designed to transmit light at a specified wavelength and below and reflect light above that wavelength. Assembly 14 also includes a thin phosphor layer 24 and a removable thick phosphor layer 26. Thin phosphor layer 24 is used for high resolution imaging applications of ionizing radiation or for very low energy (self-attenuating) ionizing radiation such as low-energy electrons or beta particles. Thick phosphor layer 26 is used for high energy ionizing radiation that freely penetrates the phosphor. Thick phosphor layer 26 is removable and is shown in FIG. 2 overlaying thin phosphor layer 24. Layer 26 is removable to the position shown in dashed lines out of contact with layer 24.

The phosphor preferably used in phosphor layers 24 and 26 is Gadolinium Oxysulfide: Terbium whose strong monochromatic line output (544–548 nanometers (NM) is ideal for coapplication with interference optics. This phosphor has technical superiority regarding linear dynamic range of output, sufficiently "live" or prompt emission and time reciprocity, and intrascenic dynamic range which exceed other phosphors and capture media. This phosphor layer preferably has a nominal thickness of 16–30 micrometers (MM) at 10–18 grams/square foot (g/ft$^2$) of phosphor coverage. Thick phosphor layer 26 has a nominal thickness of 130 MM at 80 g/ft$^2$ of phosphor coverage.

The duplex phosphor layers impart flexibility of usage for which the thick phosphor layer 26 may be removed to enhance the spatial resolution of the image. Thin phosphor layer 24 intimately contacts filter 22, whereas thick phosphor layer 26 may be alternatively placed on thin phosphor layer 24.

Interference filter 22 transmits light at 551 NM and below and reflects light above that wavelength. Filter 22 comprises layers of Zinc Sulfide-Cryolite which exhibits a large reduction in cutoff wavelength with increasing angle of incidence. The filter has a high transmission at 540–551 NM to assure good transmission of 540–548 NM transmission of the GOS phosphor. The filter also has a sharp short-pass cut-off at about 553 NM, that blue shifts at about 0.6 NM per angular degree of incidence to optimize optical gain.

Glass support 20 should be reasonably flat, clear, and free of severe defects. The thickness of support 20 can be 2 millimeters. The opposite side 28 of glass support 20 is coated with an anti-reflective layer (such as Magnesium Fluoride, green optimized) to increase transmittance and reduce optical artifacts to ensure that the large dynamic range of the phosphor emittance is captured.

Referring now to FIG. 3, there is shown a method of producing phosphor layer 24. A mixture of GOS:Tb in a binder is coated on a polytetrafluoroethylene (PTFE) support (box 30). The PTFE support enables release of the coated phosphor layer from the PTFE support and subsequent use of the phosphor layer without support, since conventional supporting materials are an optical burden to screen performance. For the thin phosphor layer 24, an ultra thin (about 0.5 g/ft$^2$, 0.5 MM thick) layer of cellulose acetate overcoat can be applied (box 32) to offer improved handling characteristics of the thin phosphor layer and to provide greater environmental protection to the underlying optical filter.

The phosphor layer is removed from the PFTE support (box 34). The thin phosphor layer overcoated side is overlayed on interference filter 22 (box 36). Clean assembly of the thin phosphor layer 24 and filter 22 assures an optical boundary that optimizes management of screen light output into camera 16. Optical coupling of layer 24 and filter 22 in not necessary, since performance reduction may result.

Layer 24 is sealed around its periphery and around the periphery of filter 22 for mechanical stability and further protection of the critical optical boundary against environmental (e.g., moisture) intrusion.

Quantitative analysis of the present invention with standard autoradiographic images comparing screens showed an increase of the apparent speed up the phosphor by about 230% substantially exceeding the Satoh, et al. device. Increased image resolution of the invention over the Satoh, et al. device was also achieved.

Applications were tested:

1. General radiography, using standard targets and phantoms, generally testing speed and spatial resolution.

2. Autoradiography using B-emitters ranging from the extremely weak emissions of 3H to the penetrating B of 32P. Also using gamma-emitting isotopes in labeled small animals (similar to nuclear medicine).

3. Electron imaging using the invention housed in a electron microscope vacuum chamber, located directly above an installed viewing window through which the CCD camera captured the screen output. Images challenging the spatial and signal resolution of electron film as well as electron diffraction images demanding extremely high dynamic range, were captured and analyzed.

General radiographic and autoradiographic speed of the invention were as fast or faster than film or film/screen systems, with the exception of larger object formats (>15 cm) for which large film is applicable. Spatial resolution was comparable to conventional X-ray film, exceeding film/screen systems. Autoradiographic speed and resolution of the invention were similarly comparable or superior to film or film/screen systems, with the exception very long exposure times (>3 hours) for which film is applicable.

Compared to storage phosphor, the speed of the inventive technology is slower for short exposure times, but the difference in speed diminishes with longer exposure times, wherein the time reciprocity of storage phosphor is not applicable. The spatial resolution of storage phosphor is generally inferior to the invention and the dynamic ranges are comparable (both very large). However, the linear dynamic and intrascenic dynamic range of both storage phosphor and film is generally inferior to the invention. The small animal autoradiography application of the invention was of great interest, although the image resolution was compromised due to the challenging depth-of-field presented by the animal; the image resolution was sufficient for interpretation and more than 20× faster than the conventional nuclear camera.

The electron imaging test (electron microscopy) of the invention clearly showed applicability, with images that were cosmetically comparable to film, comparable exposure times, but a vastly improved dynamic range.

The application of the inventive technology is, within reason, without limit when compared to existing radiographic technologies. It is within reason to assume that the cost of the inventive camera system is and will remain significantly lower than competing technologies.

The invention has been described in detail with particular reference to certain preferred embodiments thereof, but it will be understood that variations and modifications can be effected within the spirit and scope of the invention.

PARTS LIST

10 electronic imaging system
12 ionizing radiation source
14 electronic imaging screen assembly
16 electronic camera/digitizer
20 glass support
22 interference filter
thin phosphor layer
thick phosphor layer
support side
30–38 method step boxes

What is claimed is:

1. An electronic imaging system comprising;

a transparent support having first and second sides;

an optical interference coating on said first side of said transparent support;

a first prompt phosphor layer overlaying said interference coating for use in high resolution ionizing radiation imaging application or in low energy ionizing radiation imaging applications;

a second prompt phosphor layer which is movable between a first position overlaying said first prompt phosphor layer for use in high energy ionizing radiation applications and a second position removed from said first prompt phosphor layer; and an electronic camera for converting the light image produced by said first and said second prompt phosphor layers when exposed to an ionizing radiation image, into an electronic image;

wherein said phosphor of said first and second prompt phosphor layers emits radiation at wavelengths which are passed by said optical interference coating.

2. The system of claim 1 wherein said phosphor of said first and second prompt phosphor layers is the same.

3. The system of claim 1 wherein said phosphor of said first and second prompt phosphor layers is gadolinium oxysulfide terbium which emits radiation having a large green emission peak and wherein said optical interference coating has a cut off frequency which passes said emitted radiation.

4. The system of claim 1 wherein said phosphor of said first prompt phosphor layer has a thickness produced by coating at substantially 10 grams per square foot and said second prompt phosphor layer has a thickness produced by coating at substantially 80 grams per square foot.

5. The system of claim 1 including a source of an ionizing radiation image for radiating said first and said second prompt phosphor layers.

6. The system of claim 5 wherein said source of an ionizing radiation image is a projected radiation source wherein an ionizing radiation generator projects ionizing radiation through an object to produce said ionizing radiation image of said object.

7. The system of claim 5 wherein said source of an ionizing radiation image is an autoradiography source positioned adjacent to or in contact with one of said first and second prompt phosphor layers.

8. The system of claim 5 wherein said source of an ionizing radiation image is a nuclear medicine source within a living being positioned adjacent to or in contact with one of said first or second prompt phosphor layers.

* * * * *